United States Patent
Fluhr et al.

(10) Patent No.: US 12,189,415 B2
(45) Date of Patent: Jan. 7, 2025

(54) PROVIDING DETERMINISTIC FREQUENCY AND VOLTAGE ENHANCEMENTS FOR A PROCESSOR

(71) Applicant: INTERNATIONAL BUSINESS MACHINES CORPORATION, Armonk, NY (US)

(72) Inventors: Eric Jason Fluhr, Leander, TX (US); Brian Thomas Vanderpool, Byron, MN (US); Phillip John Restle, Katonah, NY (US); Francesco Anthony Campisano, Round Rock, TX (US); Michael Stephen Floyd, Cedar Park, TX (US); Ian Krispin Carmichael, Round Rock, TX (US); Eric Marz, Williston, VT (US); Richard L. Willaman, Austin, TX (US); Michael N. Goulet, Leander, TX (US); Gregory Scott Still, Raleigh, NC (US); Rahul Batra, Austin, TX (US); Rory Tatum, Pflugerville, TX (US); Isidore G. Bendrihem, Fort Lee, NJ (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 123 days.

(21) Appl. No.: 17/940,659

(22) Filed: Sep. 8, 2022

(65) Prior Publication Data

US 2023/0071427 A1    Mar. 9, 2023

Related U.S. Application Data

(60) Provisional application No. 63/242,002, filed on Sep. 8, 2021.

(51) Int. Cl.
*G06F 1/08*    (2006.01)
*G06F 1/28*    (2006.01)
(Continued)

(52) U.S. Cl.
CPC .................. *G06F 1/08* (2013.01); *G06F 1/28* (2013.01); *G06F 1/305* (2013.01); *G06F 1/3206* (2013.01); *G06F 1/324* (2013.01); *Y02D 10/00* (2018.01)

(58) Field of Classification Search
CPC ... G06F 1/08; G06F 1/28; G06F 1/305; G06F 1/3206; G06F 1/324; Y02D 10/00
See application file for complete search history.

(56) References Cited

U.S. PATENT DOCUMENTS 7,711,966 B2   5/2010   Prabhakaran et al.
8,869,152 B1   10/2014  Abrishami et al.
(Continued)

OTHER PUBLICATIONS

Drake et al., A Distributed Critical-Path Timing Monitor for a 65nm High-Performance Microprocessor, IBM, ISSCC 2007 / Session 22 / Digital Circuit Innovations / 22.1, 2007 IEEE International Solid-state Circuits Conference, Feb. 14, 2007, downloaded on Aug. 1, 2022 from IEEE Xplore, 2 pages.
(Continued)

*Primary Examiner* — Glenn A. Auve
(74) *Attorney, Agent, or Firm* — Yuanmin Cai

(57) ABSTRACT

Providing deterministic frequency and voltage enhancements for a processor is disclosed. In an embodiment, a microcontroller on a processor identifies a plurality of parameters related to a processor, the plurality of parameters including at least a current supplied to the processor; determines, in dependence upon the plurality of parameters, one or more frequency scaling indexes including determining an effective switching capacitance ratio; identifies, in dependence upon the one or more frequency scaling indexes, a
(Continued)

predetermined frequency parameter for the processor; and transitions, based on the frequency parameter, the processor to a target clock frequency. In another embodiment, a microcontroller on a processor decreases, incrementally, a power supply voltage for a processor; determines that a voltage droop parameter exceeds a voltage droop parameter threshold; and increases, incrementally, the power supply voltage in response to determining that the voltage droop parameter exceeds a voltage droop parameter threshold.

20 Claims, 13 Drawing Sheets

(51) Int. Cl.
*G06F 1/30* (2006.01)
*G06F 1/3206* (2019.01)
*G06F 1/324* (2019.01)

(56) References Cited

U.S. PATENT DOCUMENTS

| | | | |
|---|---|---|---|
| 8,943,340 | B2 | 1/2015 | Ananthakrishnan et al. |
| 9,395,782 | B2 | 7/2016 | Berry, Jr. et al. |
| 9,952,651 | B2 | 4/2018 | Allen-Ware et al. |
| 10,009,016 | B1 | 6/2018 | Ho et al. |
| 10,599,207 | B2 | 3/2020 | Allen-Ware et al. |
| 10,707,877 | B1* | 7/2020 | Majumder ............... G06F 1/08 |
| 11,249,530 | B1 | 2/2022 | Pal et al. |
| 2010/0146316 | A1* | 6/2010 | Carter .................. G06F 1/324 |
| | | | 713/322 |
| 2014/0380071 | A1* | 12/2014 | Lee ...................... G06F 1/3206 |
| | | | 713/321 |
| 2016/0179163 | A1* | 6/2016 | Haider .................. G06F 1/305 |
| | | | 713/320 |
| 2016/0370837 | A1* | 12/2016 | Shi ......................... G06F 1/324 |
| 2017/0068309 | A1* | 3/2017 | Toosizadeh ........... G06F 1/3296 |
| 2017/0344102 | A1* | 11/2017 | Kolla ..................... H02M 1/08 |
| 2018/0018009 | A1* | 1/2018 | Kommrusch ........... G06F 1/324 |
| 2019/0036530 | A1* | 1/2019 | Bose ................... H03K 17/162 |
| 2019/0265769 | A1* | 8/2019 | Gelman .................. H03K 5/01 |
| 2020/0310516 | A1* | 10/2020 | Webel ...................... G06F 1/28 |
| 2021/0081016 | A1* | 3/2021 | Hovis ................... G06F 1/3206 |
| 2021/0200286 | A1* | 7/2021 | Chaouat .................. G06F 1/26 |
| 2021/0208663 | A1* | 7/2021 | Cooper ................. G06F 1/3228 |
| 2021/0405725 | A1* | 12/2021 | Kosonocky ............. G05F 1/462 |

OTHER PUBLICATIONS

Kalyanam et al., A Proactive System for Voltage-Droop Mitigation in a 7-nm Hexagon Processor, IEEE Journal of Solid-State Circuits, vol. 56, No. 4, Apr. 2021, downloaded on Aug. 1, 2022 from IEEE Xplore, 10 pages.

Vezyrtzis et al., Droop Mitigation Using Critical-Path Sensors and an On-Chip Distributed Power Supply Estimation Engine in the z14 Enterprise Processor, IBM, ISSCC 2018 / Session 18. Adaptive Circuits and Digital Regulators / 18.1, 2018 IEEE International Solid-State Circuits Conferences, Feb. 14, 2018, downloaded on Aug. 1, 2022 from IEEE Xplore, 3 pages.

Webel et al., Proactive power management in IBM z15, International Business Machines Corporation (IBM), IBM J. Res. & Dev., vol. 64, No. 56, dated Sep./Nov. 2020, downloaded on Aug. 1, 2022 from IEEE Xplore, 12 pages.

* cited by examiner

Processor 603

Microcontroller 601

Identify A Plurality Of Parameters Related To A Processor, The Plurality Of Parameters Including At Least A Current Supplied To The Processor 602

Parameters 605

Determine, In Dependence Upon The Plurality Of Parameters, One Or More Frequency Scaling Indexes Including Determining An Effective Switching Capacitance Ratio 604

Frequency Scaling Indexes 607

Identify, In Dependence Upon The One Or More Frequency Scaling Indexes, A Predetermined Frequency Parameter For The Processor 606

Frequency Scaling Parameter 609

Transition, Based On The Frequency Parameter, The Processor To A Target Clock Frequency 608

FIG. 6

Processor 603

Microcontroller 601

Identify A Plurality Of Parameters Related To A Processor, The Plurality Of Parameters Including At Least A Current Supplied To The Processor 602

Parameters 605

Determine, In Dependence Upon The Plurality Of Parameters, One Or More Frequency Scaling Indexes Including Determining An Effective Switching Capacitance Ratio 604

Determine A Core Activity State Index 702

Frequency Scaling Indexes 607

Identify, In Dependence Upon The One Or More Frequency Scaling Indexes, A Predetermined Frequency Parameter For The Processor 606

Frequency Scaling Parameter 609

Transition, Based On The Frequency Parameter, The Processor To A Target Clock Frequency 608

FIG. 7

Processor 603

Microcontroller 601

Identify A Plurality Of Parameters Related To A Processor, The Plurality Of Parameters Including At Least A Current Supplied To The Processor 602

Parameters 605

Determine, In Dependence Upon The Plurality Of Parameters, One Or More Frequency Scaling Indexes Including Determining An Effective Switching Capacitance Ratio 604

Determine An I/O Power Index 802

Frequency Scaling Indexes 607

Identify, In Dependence Upon The One Or More Frequency Scaling Indexes, A Predetermined Frequency Parameter For The Processor 606

Frequency Scaling Parameter 609

Transition, Based On The Frequency Parameter, The Processor To A Target Clock Frequency 608

FIG. 8

Processor 603

Microcontroller 601

Identify A Plurality Of Parameters Related To A Processor, The Plurality Of Parameters Including At Least A Current Supplied To The Processor 602

Parameters 605

Determine, In Dependence Upon The Plurality Of Parameters, One Or More Frequency Scaling Indexes Including Determining An Effective Switching Capacitance Ratio 604

Determine An Ambient Conditions Index 902

Frequency Scaling Indexes 607

Identify, In Dependence Upon The One Or More Frequency Scaling Indexes, A Predetermined Frequency Parameter For The Processor 606

Frequency Scaling Parameter 609

Transition, Based On The Frequency Parameter, The Processor To A Target Clock Frequency 608

FIG. 9

Processor 603

Microcontroller 601

Identify A Plurality Of Parameters Related To A Processor, The Plurality Of Parameters Including At Least A Current Supplied To The Processor 602

Parameters 605

Determine, In Dependence Upon The Plurality Of Parameters, One Or More Frequency Scaling Indexes Including Determining An Effective Switching Capacitance Ratio 604

Frequency Scaling Indexes 607

Identify, In Dependence Upon The One Or More Frequency Scaling Indexes, A Predetermined Frequency Parameter For The Processor 606

Frequency Scaling Parameter 609

Transition, Based On The Frequency Parameter, The Processor To A Target Clock Frequency 608

Set, Based On The Target Clock Frequency, A Target Power Supply Voltage For The Processor 1002

FIG. 10

PROVIDING DETERMINISTIC FREQUENCY AND VOLTAGE ENHANCEMENTS FOR A PROCESSOR

BACKGROUND

The development of the EDVAC computer system of 1948 is often cited as the beginning of the computer era. Since that time, computer systems have evolved into extremely complicated devices. Today's computers are much more sophisticated than early systems such as the EDVAC. Computer systems typically include a combination of hardware and software components, application programs, operating systems, processors, buses, memory, input/output devices, and so on. As advances in semiconductor processing and computer architecture push the performance of the computer higher and higher, more sophisticated computer software has evolved to take advantage of the higher performance of the hardware, resulting in computer systems today that are much more powerful than just a few years ago.

Shrinking transistor sizes allow increased logic complexity in modern processors, but smaller dimensions increase power density and require reduced maximum voltage ($VDD_{MAX}$) for reliability. This can severely limit the performance achievable in new technologies.

SUMMARY

Embodiments in accordance with the present disclosure provide deterministic frequency and voltage enhancements. A workload optimized frequency control loop deterministically maximizes frequency based on a multidimensional analysis of processor states and conditions. Digital droop sensors use core-throttling or adaptive clock to mitigate microprocessor voltage droops. Robust droop mitigation facilitates a voltage control loop to minimize voltage. This voltage control loop offsets load line uplift, keeping voltage below the reliability $VDD_{MAX}$, while protecting against performance loss from excessive droop mitigation.

An embodiment in accordance with the present disclosure is directed to a method of providing deterministic frequency and voltage enhancements for a processor. The method includes identifying a plurality of parameters related to a processor, the plurality of parameters including at least a current supplied to the processor. The method also includes determining, in dependence upon the plurality of parameters, one or more frequency scaling indexes including determining an effective switching capacitance ratio. The method also includes identifying, in dependence upon the one or more frequency scaling indexes, a predetermined frequency parameter for the processor. The method further includes transitioning, based on the frequency parameter, the processor to a target clock frequency. In some examples, the plurality of parameters further includes one or more of: an ambient temperature, an altitude, one or more input/output (I/O) configuration parameters, one or more core power states, one or more core clock states, an average voltage, and an average frequency. In some examples, the predetermined frequency parameter is identified from a table that maps the one or more frequency scaling indexes to the predetermined frequency parameter.

In some variations of the embodiment, determining, based on the plurality of parameters, one or more frequency scaling indexes includes determining a core activity state index. In some variations, determining, based on the plurality of parameters, one or more frequency scaling indexes includes determining an input/output power index. In some variations, determining, based on the plurality of parameters, one or more frequency scaling indexes includes determining an ambient conditions index. In some examples, transitioning, based on the target clock frequency, the processor to a target clock frequency includes setting, based on the target clock frequency, a target power supply voltage for the processor.

In some variations this embodiment, the method also includes decreasing, incrementally, the power supply voltage for the processor, determining that a voltage droop parameter exceeds a voltage droop parameter threshold, and increasing, incrementally, the power supply voltage in response to determining that the voltage droop parameter exceeds a voltage droop parameter threshold.

In some variations of this embodiment, the method further includes detecting a voltage droop based on a core voltage falling below a core voltage threshold, throttling one or more regions of the core in response to detecting the voltage droop, and decreasing, incrementally, an amount of throttling based on an increase in core voltage. In some examples, the core voltage threshold is adjusted dynamically in response to transitioning, based on the frequency parameter, the processor to a target clock frequency.

Another embodiment is directed to an apparatus comprising a processor and a memory storing instructions that, when executed by the processor, configure the apparatus to identify a plurality of parameters related to a processor, the plurality of parameters including at least a current supplied to the processor. The instructions further configure the apparatus to determine, in dependence upon the plurality of parameters, one or more frequency scaling indexes including determining an effective switching capacitance ratio. The instructions further configure the apparatus to identify, in dependence upon the one or more frequency scaling indexes, a predetermined frequency parameter for the processor. The instructions further configure the apparatus to transition, based on the frequency parameter, the processor to a target clock frequency. In some examples, the predetermined frequency parameter is identified from a table that maps the one or more frequency scaling indexes to the predetermined frequency parameter.

In some variations of the embodiment, determining, based on the plurality of parameters, one or more frequency scaling indexes includes determining a core activity state index. In some variations, determining, based on the plurality of parameters, one or more frequency scaling indexes includes determining an input/output power index. In some variations, determining, based on the plurality of parameters, one or more frequency scaling indexes includes determining an ambient conditions index. In some examples, transitioning, based on the target clock frequency, the processor to a target clock frequency includes setting, based on the target clock frequency, a target power supply voltage for the processor.

Another embodiment in accordance with the present disclosure is directed to a computer program product comprising a non-transitory computer-readable medium storing computer program instructions that, when executed, cause a computer to identify a plurality of parameters related to a processor, the plurality of parameters including at least a current supplied to the processor. The instructions further cause the computer to determine, in dependence upon the plurality of parameters, one or more frequency scaling indexes including determining an effective switching capacitance ratio. The instructions further cause the computer to identify, in dependence upon the one or more frequency scaling indexes, a predetermined frequency parameter for the processor. The instructions further cause the computer to transition, based on the frequency parameter, the processor to a target clock frequency.

In some variations of the embodiment, determining, based on the plurality of parameters, one or more frequency scaling indexes includes determining a core activity state index. In some variations, determining, based on the plurality of parameters, one or more frequency scaling indexes includes determining an input/output power index. In some variations, determining, based on the plurality of parameters, one or more frequency scaling indexes includes determining an ambient conditions index. In some examples, transitioning, based on the target clock frequency, the processor to a target clock frequency includes setting, based on the target clock frequency, a target power supply voltage for the processor.

Another embodiment in accordance with the present disclosure is directed to another method of providing deterministic frequency and voltage enhancements on a processor. The method includes decreasing, incrementally, a power supply voltage for a processor. The method also includes determining that a voltage droop parameter exceeds a voltage droop parameter threshold. The method further includes increasing, incrementally, the power supply voltage in response to determining that the voltage droop parameter exceeds a voltage droop parameter threshold.

In some examples, the method also includes detecting a voltage droop based on a core voltage falling below a core voltage threshold and, in response to detecting the voltage droop, throttling one or more regions of the core. The method further includes decreasing, incrementally, an amount of throttling based on an increase in core voltage.

In some variations, the core voltage threshold is adjusted dynamically in response to transitioning, based on the frequency parameter, the processor to a target clock frequency. In some variations, the voltage droop parameter is at least one of a number of voltage droop events, a rate of voltage droop events, a number of cycles that a droop mitigation action is active, and a fraction of cycles that the droop mitigation action is active. In some variations, size of a power supply voltage increment is dynamically selected based on the voltage droop parameter; and wherein a size of a power supply voltage decrement is dynamically selected based on the voltage droop parameter.

The foregoing and other objects, features and advantages of the invention will be apparent from the following more particular descriptions of exemplary embodiments of the invention as illustrated in the accompanying drawings wherein like reference numbers generally represent like parts of exemplary embodiments of the invention.

BRIEF DESCRIPTION OF THE DRAWINGS

FIG. 6 sets forth a flow chart illustrating an example method of providing deterministic frequency and voltage enhancements for a processor in accordance with some embodiments of the present disclosure.

FIG. 7 sets forth a flow chart illustrating another example method of providing deterministic frequency and voltage enhancements for a processor in accordance with some embodiments of the present disclosure.

FIG. 8 sets forth a flow chart illustrating another example method of providing deterministic frequency and voltage enhancements for a processor in accordance with some embodiments of the present disclosure.

FIG. 9 sets forth a flow chart illustrating another example method of providing deterministic frequency and voltage enhancements for a processor in accordance with some embodiments of the present disclosure.

FIG. 10 sets forth a flow chart illustrating another example method of providing deterministic frequency and voltage enhancements for a processor in accordance with some embodiments of the present disclosure.

DETAILED DESCRIPTION

Figure 1:
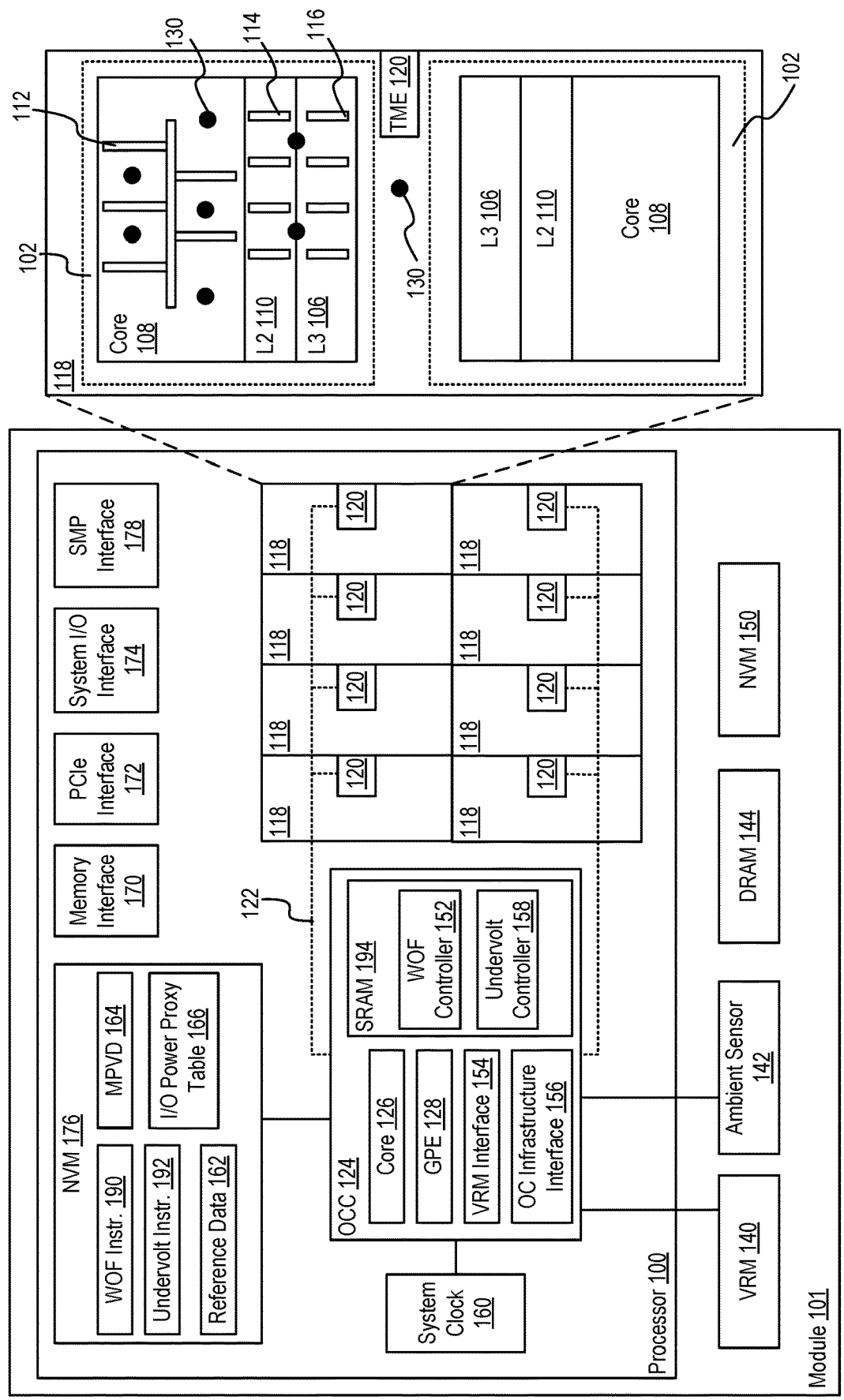
FIG. 1 sets forth a diagram of an example processor for providing deterministic frequency and voltage enhancements for a processor in accordance with some embodiments of the present disclosure.

Exemplary methods, apparatus, and products for providing deterministic frequency and voltage enhancements for a processor in accordance with the present invention are described with reference to the accompanying drawings, beginning with FIG. 1. FIG. 1 sets forth a diagram of an example processor 100 for providing deterministic frequency and voltage enhancements for a processor in accordance with some embodiments of the present disclosure. The example processor 100 illustrated in FIG. 1 depicts an example layout of an example processor architecture. It will be appreciated that embodiments in accordance with the present disclosure are not limited to the example layout and architecture shown in FIG. 1. In fact, embodiments of the present disclosure may be adapted to any processor without departing from the spirit of the present disclosure.

The example processor 100 includes multiple processor cores 108 and their associated caches, such as layer 2 (L2) and layer 5 (L3) caches. The example processor 100 also includes input/output (I/O) interfaces such as one or more memory interfaces 170, one or more peripheral computer interconnect express (PCIe) interfaces 172, one or more system I/O interfaces 174, and one or more synchronous multiprocessing (SMP) interfaces 178. The example processor 100 also includes a system clock 160. In some examples, the system clock 160 is implemented by a digital phase locked loop (DPLL). The system clock 160 provides the clock for the cores 108 and their caches through a clock network (not shown). The example processor 100 also includes one or more nonvolatile memory units 176. In various examples, the nonvolatile memory units 176 may be ROM, EPROM, EEPROM, or Flash memory units. The nonvolatile memory units 176 may store firmware, such as microcode instruction executable by the processor, that controls power and thermal management of processor. In one example, a nonvolatile memory unit 176 stores firmware 190 embodying a deterministic workload optimized frequency (WOF) controller 152, which is a control loop that provides deterministic frequency enhancements for the system clock 160 based on observable parameters and conditions in and around the processor 100, processor characterizations, and processor models. The WOF controller 152 will be described in greater detail below. In another example, a nonvolatile memory unit 176 stores firmware 192 embodying an undervolt controller 158, which is a control loop providing voltage enhancements to lower VDD based on workload and observed voltage droops. The undervolt controller 158 will be described in greater detail below. In some examples, one or more nonvolatile memory units 176 store reference data 162 such as processor characterization data, processor models, reference tables, characteristic equations, frequency clip tables, and other such information useful to the WOF controller 152 and/or the undervolt controller 158, as will be made apparent below. For example, the reference data 162 may include module vital product data (MVPD) 164, which is described in more detail below.

In some examples, the processor includes an on-chip controller 124 that implements the WOF controller 152 and the undervolt controller 158. The on-chip controller 124 includes an embedded core 126 working with one or more general purpose engine (GPE) microcontrollers 128. In some examples, the on-chip controller 124 executes firmware instructions 190 embodying the WOF controller 152 that are stored in a nonvolatile memory unit 176, which are executable by the core 126 of the on-chip controller 124 to carry out a WOF control loop described in more detail below. For example, the firmware instruction may be loaded into static random-access memory (SRAM) 194 for execution by the core 126. In some examples, the on-chip controller 124 executes firmware instructions 192 embodying the undervolt controller 158 that are stored in a nonvolatile memory unit 176, which are executable by the core 126 of the on-chip controller 124 to carry out an undervolt control loop described in more detail below. For example, the firmware instruction may be loaded into a SRAM 194 for execution by the core 126. In some examples, the on-chip controller 124 also includes a voltage regulation module (VRM) interface 154 through which the on-chip controller 124 receives VDD voltage and current information for the processor 100 from the VRM 140, and through which the on-chip controller 124 sets a VDD voltage parameter (e.g., in a VRM register) that is used by the VRM 140 to control the VDD voltage. In some examples, the on-chip controller 124 also includes an on-chip infrastructure interface 156 that provides access to data from digital thermal sensors, droop sensors, and other on-chip sensors.

In some examples, the module 101 includes the processor 100, the VRM 140, nonvolatile memory units 150, dynamic random access memory (DRAM) 144, an ambient sensor 142, and external package pins (not shown), as well as other components that are omitted from FIG. 1 in the interest of clarity. The VRM 140 is coupled to a power supply and controls the VDD to processor 100. The nonvolatile memory units 150 may be ROM, EPROM, EEPROM, or Flash memory units. For example, like the nonvolatile memory units 176, the nonvolatile memory units 150 may also store firmware or reference data.

In some examples, as depicted, the example processor 100 is organized into sixteen core units 102, each core unit 102 including a core region and an L3 cache region. Each core region includes a processor core 108 and an L2 cache 110, as well as one or more core power headers 112 and one or more L2 cache power headers 114 that are each independently controlled. The core power headers 112 and L2 cache power headers 114 relay a voltage supply to discrete sections of the core 108 and the L2 cache 110, and further act as switches to turn power on and off for these sections. The L3 cache region includes an L3 cache 106 and one or more L3 cache power headers 116 that are each independently controlled. The L3 cache power headers 116 relay a voltage supply to discrete sections of the L3 cache 106, and further act as switches to turn power on and off for these sections. The core power headers 112, L2 cache power headers 114, and L3 cache power headers 116 receive VDD from the VRM 140.

In some examples, the example processor 100 is organized into tiles 118 for thermal and power management. In the example depicted in FIG. 1, the processor 100 includes eight tiles 118 that each include two core units 102. Each tile 118 also includes a tile management engine 120 that is an embedded microcontroller controlling the core power headers 112, L2 power headers 114, and the L3 cache power headers 116 including transitioning the cores to power save states by, for example, turning the power headers 112, 114, 116 off or stopping region clocks. For example, using an architected STOP instruction, an operating system may request a core 108 to enter a power save state. The core signals the tile management engine 120 to perform this transition, which can include stopping region clocks or powering off regions. The tile management engine 120 also performs the reverse operations to bring the core 108 out of power save states in reaction to system interrupts or other wakeup events. The tile management engines 120 are connected via a sideband communications bus 122 to the on-chip controller 124 to which the tile management engines 120 communicate core power save states and clock power states.

In some examples, as depicted, each core unit 102 includes multiple digital thermal sensors 130 (also referred to herein as a DTS) configured to detect a temperature within a particular area of the core unit 102. For example, the cores 108, L2 cache 110, and L3 cache 106 may each include one or more digital thermal sensors 130. The module 101 also includes an ambient sensor 142 that collects ambient condition information such as, for example, an ambient temperature and an ambient altitude. Readings from the digital thermal sensors 130 and the ambient sensor 142 are relayed to one or more controllers of the processor 100 such as the on-chip controller 124. In some implementations, readings from the digital thermal sensors 130 and the ambient sensor 142 are collected by the on-chip controller 124, for example, through the on-chip infrastructure interface 156.

As discussed above, the system clock 160 provides the clock for the core units 102 through a clock network (not shown). In some examples, all core units 102 use the same clock values from the system clock 160. In some examples, each core uses a dedicated clock frequency source. In other examples, there are a number of core clock sources, with different subsets of cores using different clock sources. As will be explained in more detail below, the system clock 160 is configured to operate a clock frequency of the processor 100 based on a value set by the on-chip controller 124. For example, the on-chip controller 124 may set a clock register with a value for a target clock frequency. In other examples, there may be multiple registers and multiple frequencies for subsets of cores, or for each individual core. For simplicity, the descriptions below describe a processor with a single clock source used for all cores. This can be easily generalized so that different cores or subsets of cores can have different clock frequency choices and different voltages or voltage-control loops.

To facilitate deterministic frequency and voltage enhancements in accordance with the present disclosure, the MVPD 164 includes processor characterization data that is generated at manufacture and written into a nonvolatile memory unit on the processor 100 or module 101. In some examples, the MVPD 164 includes AC current, DC current, and leakage current measured while the processor 100 is under a thermal design point (TDP) workload. These measurements are taken at curve fit points within a target operating frequency and VDD range. In some examples, digital droop sensor calibration values (described in more detail below) are also recorded for these curve fit points. In other examples, an off-module memory, such as an external ROM or disk-drive, contains parameters that are copied into RAM on the module or chip for frequency and voltage control purposes.

In some examples, as mentioned above, the on-chip controller 124 implements the WOF controller 152 through the execution of firmware including executable microcode that embodies the WOF controller 152. However, it should be appreciated that the WOF controller 152 may also be implemented in digital logic of an integrated circuit, as processor-executable software, in in some other form. The WOF controller 152 carries out a WOF control loop that executes iteratively (e.g., every 500 microseconds). In some implementations, the WOF control loop includes a collect phase, a compute phase, a lookup phase, and an actuate phase.

During the collect phase, the WOF controller 152 identifies parameters gathered by the on-chip controller 124 from the VRM 140, tile management engines 120, digital thermal sensors 130, ambient sensor 142, and so on. For example, the WOF controller 152 identifies a VDD current (IDD) for the processor that is read by the on-chip controller 124 from the voltage regulator module 140. As another example, the WOF controller 152 identifies on-die temperatures provided to the on-chip controller 124 from the digital thermal sensors 130. As yet another example, the WOF controller 152 identifies average clock and power states for all cores and caches (i.e., whether clocks or power are off in those regions) that are provided to the on-chip controller 124 by the tile management engines 120. As yet another example, the WOF controller 152 identifies an I/O bus configuration of the processor that is determined by the on-chip controller 124 through polling of the I/O interfaces. As yet another example, the WOF controller 152 identifies ambient temperature and altitude reported to the on-chip controller 124 from the ambient sensor 142. Further, the WOF controller 152 identifies the average VDD voltage and the frequency recorded over the last WOF cycle (e.g., 500 microseconds).

During the compute phase, the WOF controller 152 generates one or more indexes for use with a predefined frequency clip table. In some examples, a primary index is an effective switching capacitance ($C_{eff}$) ratio. Generally, power consumed by the processor includes active power (the result of gate switching at the clock frequency) and static power (the result of leakage due to silicon process). The active power can be expressed by equation 1:

$$P_{active} = C_{eff} V^k f = I_{active} V \qquad (1)$$

Where V is VDD, f is the processor frequency, and k is a technology dependent factor that is commonly '2,' although varies due to VDD sensitivity to capacitance. Thus, effective switching capacitance for the active workload can be expressed by equation 2:

$$C_{eff\text{-}active} = I_{active}/Vf \qquad (2)$$

Where $I_{active}$ is IDD less IDD quiescent. Thus, the $C_{eff\text{-}active}$ may be computed using the IDD parameter from the VRM 140 and leakage data from MVPD, as well as the average VDD and frequency recorded over the last WOF cycle. This provides a workload metric that can be compared to the TDP. An effective switching capacitance for the TDP workload may be calculated using the AC current value for the same voltage and frequency from the TDP characterization curve represented in the MVPD 164, thereby normalizing out process, voltage and frequency. Thus, the effective switching capacitance ratio is expressed by equation 3:

$$C_{eff\text{-}ratio} = C_{eff\text{-}active}/C_{eff\text{-}tdp} \qquad (3)$$

When $C_{eff\text{-}active}$ is less than $C_{eff\text{-}tdp}$, and thus the $C_{eff\text{-}ratio}$ decreases, the resulting power credit allows core frequency to be increased.

In some examples, a second index computed by the WOF controller 152 is a core activity state. The core activity state is a ratio of the average time the cores are active, clocked off, or powered off, relative to fully active, resulting in a power credit. The core activity state can be computed based on core STOP states that are reported by the tile management engines 120. For example, if the WOF controller 152 identifies that, on average, the core regions are only 80% active, a power consumption modeled for fully active cores in the TDP definition can be reduced by 20%, which can allow for an additional frequency boost.

In some examples, a third index computed by the WOF controller 152 is I/O power. In these examples, the WOF controller 152 uses the runtime-sampled bus configuration, which can be identified by the on-chip controller 124 polling the I/O interfaces, and an I/O power proxy table 166 to identify the associated power parameter for each link type (e.g., memory, PCIe, SMP) of the current I/O configuration. These power parameters may be accumulated into a single index. When the current I/O configuration uses less power than the I/O configuration modeled for an TDP definition, the resulting power credit can allow for an additional frequency boost. The I/O power proxy table 166 may be stored in the reference data 162 or incorporated into the MVPD 164, or as separate reference data in a different nonvolatile memory unit.

In some examples, a fourth index computed by the WOF controller 152 is an ambient condition index. The ambient condition index adjusts for the ambient room temperature and altitude to give a thermal cooling credit to the expected TDP definition. For example, the WOF controller 152 may provide N watts of power credit per degree Celsius that the ambient temperature is below a reference value used for the TDP definition. The WOF temperature component is dependent on sensing at the system air-intake, not within the processor, which provides deterministic benefit (i.e., not sensitive to manufacturing variations). The altitude component stems from higher density air improving the effectiveness of heatsink cooling at altitudes less than 1000 meters. The ambient condition index can be computed based on ambient temperature and altitude parameters reported by the ambient sensor 142 to the on-chip controller 124.

During the lookup phase, the WOF controller 152 utilizes the computed indexes to identify an optimized operating frequency. In some examples, the WOF controller 152 identifies a frequency from one or more WOF frequency clip tables stored in the MVPD 164. To generate the WOF clip tables, each point in the WOF operating space across all four dimensions described above is simulated and stored in the MVPD. This ensures deterministic frequency behavior for all modules of a given product. In each frequency clip table, frequency is plotted as a function of the primary index $C_{\mathit{eff}\text{-}\mathit{ratio}}$ along a primary curve, with the TDP frequency occurring at a $C_{\mathit{eff}\text{-}\mathit{ratio}}$ of '1.' Lighter workloads than the TDP model leads to decreased $C_{\mathit{eff}\text{-}\mathit{ratio}}$ and higher frequency, whereas heavier workloads than the TDP model leads to increased $C_{\mathit{eff}\text{-}\mathit{ratio}}$ and lower frequency. For each additional dimension, a frequency clip table for that dimension includes secondary curves plotted based on that dimensional index. The $C_{\mathit{eff}\text{-}\mathit{ratio}}$ calculated causes the operating frequency of the module to move along the x-axis while the other indices apply secondary frequency adjustments to the primary curve along the y-axis. The result is a WOF frequency that the processor can boost to within the system power delivery, thermal cooling, and technology voltage limits.

Figure 2:
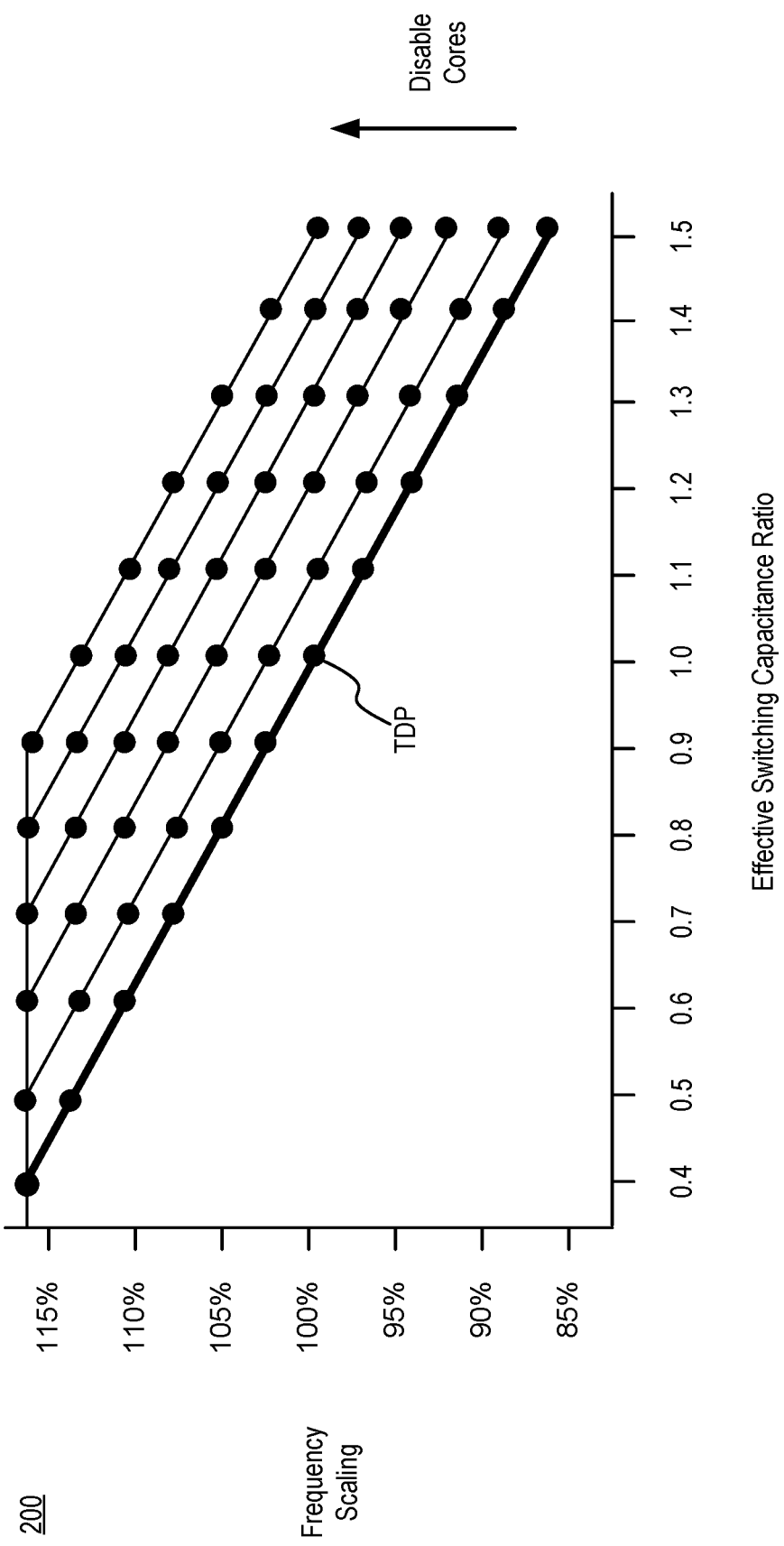
FIG. 2 sets forth a graphical representation of an example frequency clip table for a core activity state in accordance with some embodiments of the present disclosure.

For further explanation, FIG. 2 sets forth a graphical representation of an example frequency clip table 200 for a core activity state in accordance with some embodiments of the present disclosure. The frequency clip table 200 includes a primary curve of core frequency vs. the primary index $C_{\mathit{eff}\text{-}\mathit{ratio}}$ for the TDP model in which all cores are fully active. Secondary curves are provided for additional models in which a varying number of cores are disabled. Where cores are not fully active during the measurement interval, the core activity state may be used to index a secondary curve that is shifted up along the y-axis, thus yielding a frequency boost.

Figure 3:
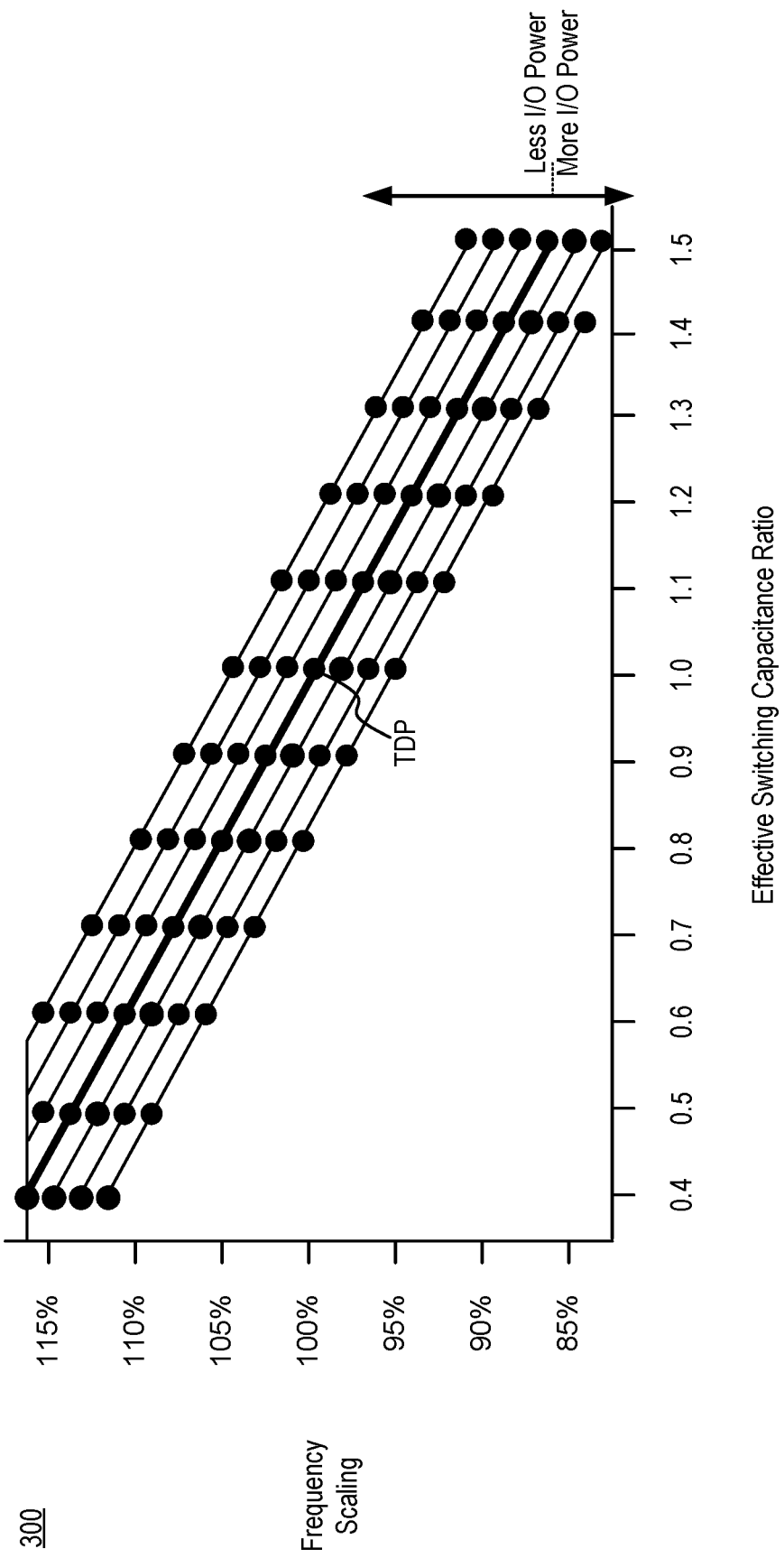
FIG. 3 sets forth a graphical representation of an example frequency clip table for I/O power in accordance with some embodiments of the present disclosure.

For further explanation, FIG. 3 sets forth a graphical representation of an example frequency clip table 300 for I/O power in accordance with some embodiments of the present disclosure. The frequency clip table 300 includes a primary curve of core frequency vs. the primary index $C_{\mathit{eff}\text{-}\mathit{ratio}}$ for a TDP model using a reference I/O configuration. Secondary curves are provided for additional models in which more or less I/O power is required based on the I/O configuration. Where less I/O power than the reference model is utilized, the I/O power may be used to index a particular secondary curve that is shifted up along the y-axis, thus yielding a frequency boost. Where more I/O power than the reference model is utilized, the I/O power may be used to index a particular secondary curve that is shifted down along the y-axis, thus requiring a lower frequency.

Figure 4:
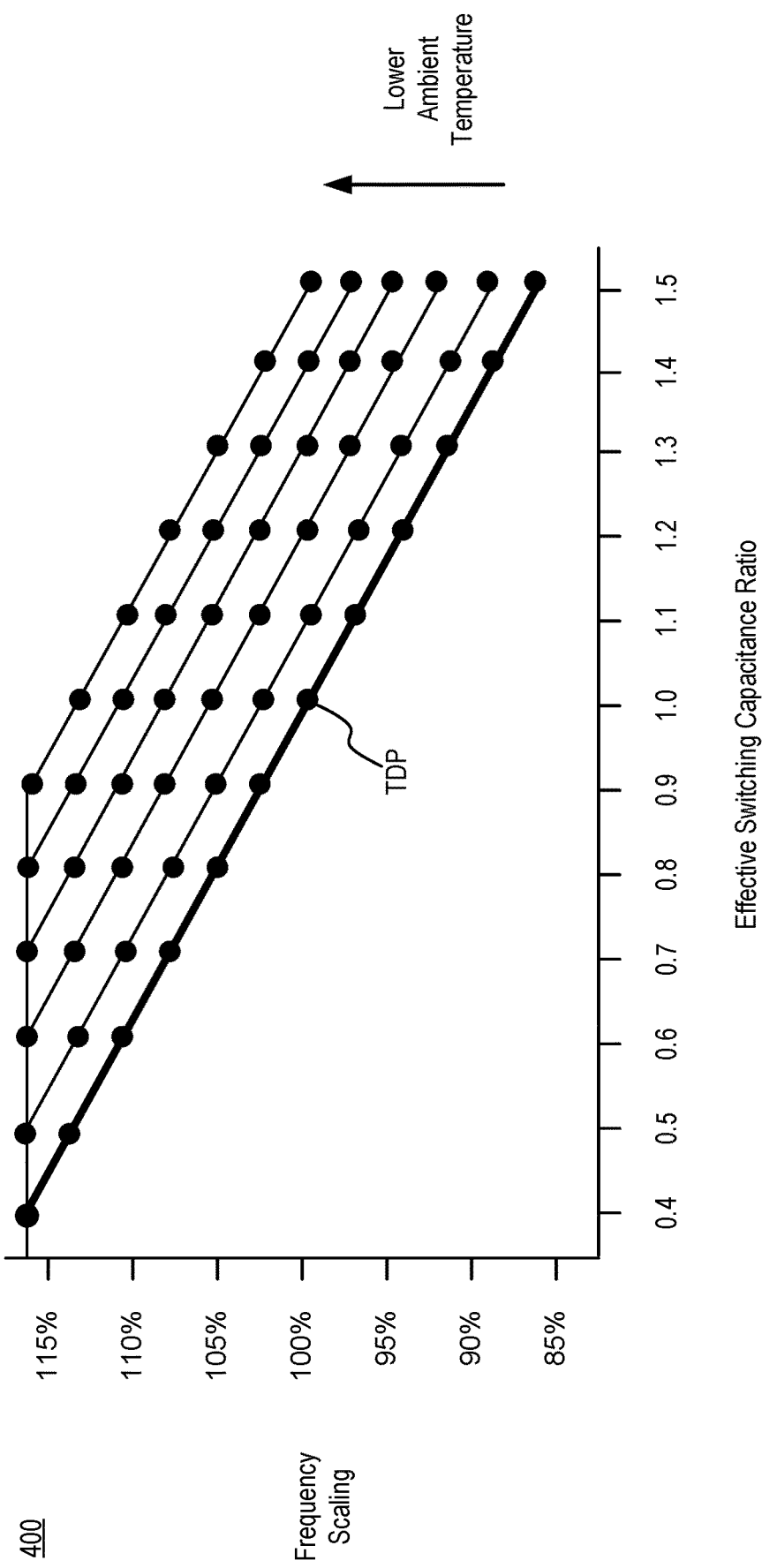
FIG. 4 sets forth a graphical representation of an example frequency clip table for ambient conditions in accordance with some embodiments of the present disclosure.

For further explanation, FIG. 4 sets forth a graphical representation of an example frequency clip table 400 for ambient conditions in accordance with some embodiments of the present disclosure. The frequency clip table 400 includes a primary curve of core frequency vs. the primary index $C_{\mathit{eff}\text{-}\mathit{ratio}}$ for a TDP model using a reference ambient temperature. Secondary curves are provided for additional models in which the ambient temperature is higher or lower than that used for a TDP reference model. Where the ambient temperature is lower than the model, the ambient conditions index may be used to index a particular secondary curve that is shifted up along the y-axis, thus yielding a frequency boost. Where the ambient temperature is lower than the model, the ambient conditions index may be used to index a particular secondary curve that is shifted down along the y-axis, thus requiring a lower frequency.

Returning to FIG. 1, during the actuation phase, the WOF controller 152 transitions the processor 100 to a new target frequency based in part on the frequency from the lookup phase. For example, the WOF controller 152 may utilize the minimum of (a) the frequency from the lookup phase, (b) thermal limits and (c) software directed requests to adjust the frequency of the system clock 160. In some examples, the WOF controller 152 uses the frequency parameter identified from the lookup phase to set a frequency for the system clock 160 by writing a value of the frequency to a register of the system clock 160 or otherwise indicating the frequency to the system clock 160. In some examples, the WOF controller 152 also uses the frequency parameter identified from the lookup phase to identify a corresponding target VDD from the MVPD 164. In these examples, the WOF controller 152 signals the VRM 140 to adjust the set VDD to the target VDD.

As described above, the WOF controller 152 provides deterministic dynamic frequency and voltage scaling in response to changing workloads on the processor. These changing workloads may also cause power supply droops that can potentially cause critical failures in the processor cores, particularly where an intense load is placed on the processor after a relatively idle state. Droop mitigation techniques may be employed to safeguard against such critical failures. While reducing clock frequency alone can mitigate droops with less incremental performance effect per droop, this may be incompatible with the response times associated with a global clock architecture where all active cores and caches share a single clock to improve cache latency and coherency. In accordance with some embodiments of the present disclosure, power supply droop mitigation is accomplished by sensing droops with digital droop sensors in each core.

Figure 5:
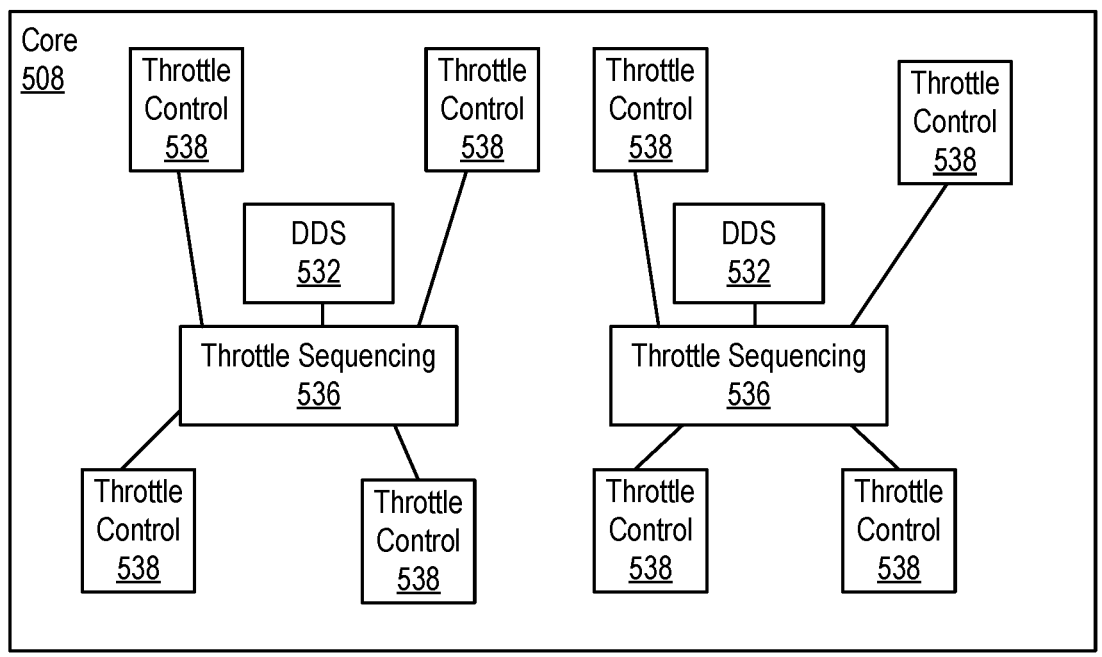
FIG. 5 sets forth a block diagram of an example droop mitigation system in accordance with some embodiments of the present disclosure.

FIG. 5 sets forth a block diagram of an example droop mitigation system in accordance with some embodiments of the present disclosure. The droop mitigation system is shown in the context of an example core 508 (e.g., a core 108 described above) that includes one or more digital droop sensors 532 (also referred to herein as 'DDS') configured to detect a voltage droop in the processor core 508. Each digital droop sensor 532 is coupled to a throttle sequencing engine 536, which is coupled to one or more core throttle controllers 538. Thus, each digital droop sensor 532 is configured to issue commands to the throttle sequencing engine 536, which in turn issues core throttling commands to the core throttle controllers 538 to throttle instruction processing in the core 508.

Starting from system idle to a high intensity workload on the processor cores cause significant gate switching and creates a large current draw. The local capacitance is not sufficient to maintain the initial voltage and the core voltage ($V_{core}$) droops suddenly, until adequate current can be provided to compensate for the increased load. After the voltage droop, the final $V_{core}$ reaches a steady state value dictated by the system loadline. Utilizing droop sensors, the core can engage droop mitigation when $V_{core}$ drops below a threshold. Core throttling is chosen to restrict throughput, reducing latch and data switching rates. The core throttle settings are programmable and characterized to determine values that will quickly stop the droop as well as subsequently recover full instruction execution in a controlled manner. Simply turning off the throttle would generate another droop as the system transitions from idle back to the heavy workload. Taking advantage of this droop mitigation, VDD can be reduced to maintain the same timing margin at the bottom of the mitigated droop. After a controlled return from throttling, the final workload induced voltage has a similar loadline cost as the non-throttled case. However, both VDD and the die circuit voltage ($V_{core}$) are reduced through the savings provide by droop mitigation.

In some examples, each digital droop sensor 532 contains a programmable delay feeding a latch-tapped-delay-line with 24 output latches. The 24 output latches produce a thermometer code value proportional to the timing margin for the previous 2 clock cycles. When voltage droops are detected by a digital droop sensor 532, core instruction rates are briefly throttled in that core to reduce current, thus stopping droops to protect a timing margin.

In some examples, each digital droop sensor 532 is calibrated during manufacturing test to ensure appropriate timing margin protection of processor critical timing paths. In an example calibration process, the $VDD_{MIN}$ of all good cores is determined at each of up to 8 frequencies. Then, starting from each frequency point, the digital droop sensor 532 calibration state is entered: frequency is reduced, and voltage is increased to provide guard band over the short-duration $VDD_{MIN}$, and the same workload is executed. The programmable delay of every digital droop sensor 532 is adjusted to output the same minimum thermometer-code value M. M is chosen to allow observation of typical operation as well as worst case droops within the 24-bit thermometer code. For example, when the two digital droop sensors 532 in each core always read a value of M or higher, that core has the desired timing margin. The next step of calibration pulses a high-current workload on all cores to create maximal droops, during which the DDS trigger that initiates throttling is tuned to prevent DDS monitoring in any core to drop below M. Since the droop mitigation may take, for example, approximately 5 nanoseconds to detect and stop a droop, throttling begins at a DDS value of M+N, where the trigger threshold N is chosen to guarantee no digital droop sensor 532 ever reads a value below M regardless of the starting VDD. N may be uniquely chosen for each frequency point tested. Once each digital droop sensor 532 is calibrated and the trigger threshold determined, DDS droop mitigation protects timing margin over a wide range of VID values and workloads at each desired target frequency.

Depending on the global clocking architecture and design, as well as the response time to adapt the clock frequency compared to the response time to actuate core throttling, either droop-throttling or adaptive clock methods, or both, may be optimal to provide robust droop mitigation over the required range of voltages at each desired core clock target frequency. In other embodiments, droop-mitigation uses current-injection from nearby capacitance charged to a higher voltage or other switched-capacitor schemes.

Regardless of the specific droop-mitigation method, when robust droop-mitigation is enabled, the cores are protected from functional errors over a wider range of regulator VDD setpoints. This robust timing protection enables a dynamic voltage adjustment, since if the VDD setpoint is temporarily too low, the droop mitigation will prevent errors. This may result in temporary performance loss, but this can be corrected quickly. In the last step, voltage is adjusted while a product-reference workload is run to find the lowest VDD value that reduces DDS detection and throttling to rates that have no significant effect on processor performance. This final voltage is then used for power measurements at each frequency and may be written into MVPD. WOF control loop computations rely on this voltage as a primary reference for runtime power and frequency optimization. When managing dynamic voltage and frequency slewing (DVFS), the WOF control loop interpolates the calibration delays, DDS trigger values, and relative voltages between the MVPD content associated with each frequency point. Since the DDS delay is sensitive to temperature, cross-chip voltage gradients, and end of life degradation much like critical circuit delays, the tracking between DDS and the critical paths enables reduction in the associated guard bands. In some examples, the VDD written in the MVPD is used only as a starting point during the boot process, after which the VDD is dynamically optimized. In some examples, the WOF controller 152 signals an updated DDS throttling trigger threshold N to one or more digital droop sensor 532 in response to transitioning the processor 100 to a new frequency, where the updated DDS trigger value for that frequency is derived from the MVPD 164.

For most workloads where the $C_{eff}$ changes relatively rarely by relatively small amounts, a very simple control loop is sufficient. For some problematic highly variable workloads, there may be increased average performance loss for an extended period of time. In that case the simple control loop can be supplemented using machine learning methods such as Reinforcement Learning, to reduce performance loss while remaining within Vmax or Power limits or other constraints.

Returning to FIG. 1, the firmware unit 150 also stores microcode instructions 192 for an undervolt controller 158 that are executable by the core 126 of the on-chip controller 124 to carry out an undervolt control loop. In some examples, the undervolt control loop utilizes the droop sensors (e.g., the digital droop sensors 532 of FIG. 5) to further lower voltages even further by dynamically adjusting the VDD to the minimum value that prevents performance loss. Initially, the VDD is reduced during system idle based on droop sensor feedback. When a high intensity workload starts, the voltage quickly drops below the throttle threshold and core throttling engages to maintain the voltage margin. As throttling eases off, the VDD is still too low to provide enough current to maintain a $V_{core}$ above the throttle threshold, which re-engages core throttling. However, the undervolt control loop detects this iterative core throttling and raises the VDD incrementally until droop events have no impact on performance. The voltage oscillates around the floor voltage while VDD is increased and throttling is active. By continuously optimizing the required voltage to provide just enough to avoid circuit failure, the undervolt control loop reduces $V_{core}$ voltages significantly, enabling higher clock frequencies while staying below the $VDD_{MAX}$ limit, as well as current and power limits.

In some examples, the undervolt control loop leverages droop indications from digital droop sensors (e.g., the digital droop sensors 532 of FIG. 5) to continuously adjust VDD voltages. Although a digital droop sensor 532 injects throttles to the core in the short term, if droops repeat, the undervolt control loop raises VDD to prevent any performance effect. While the undervolt control loop is referred to 'undervolt,' the undervolt control loop may temporarily increase VDD above the reference value in the MVPD if required. In some examples, VDD is controlled by counting the number of cycles a measured digital droop sensor 532 value is at or below a chosen digital droop sensor value (separate from the value that initiates throttling by the digital droop sensor 532). If a digital droop sensor 532 reads at or below this value for a number of measuring instances above a predetermined threshold, the VDD voltage is increased. Otherwise, the voltage is decreased at a particular interval (e.g., every 125 microseconds). When the WOF control loop initiates a frequency transition, throttling carried out by the digital droop sensor 532 maintains a timing margin, while the undervolt control loop optimizes VDD to the lowest value that avoids any performance effect.

In some examples, VDD is controlled by counting the number of cycles the DDS value is at or below a chosen DDS undervolting bin $B_{UNDERVOLT}$. This undervolting bin can be chosen to be $N_{diff}$ bins above $B_{THROTTLE}$ that elicits core throttling and droop mitigation by the digital droop sensors 532. If the digital droop sensor reads at or below this value too often, VDD is increased. Otherwise, the VDD is decreased incrementally (e.g., every 125 microseconds).

It will be appreciated that the combined effect of the WOF control loop and the undervolt control loop to manage frequency and voltage allow for an increase in frequency and a reduction in VDD with negligible performance loss. In particular, utilization of the ambient index and I/O configuration index by the WOF control loop, as described above, allows for an increase in frequency for a workload, while droop mitigation by the digital droop sensors 532 reduces the voltage guardband, also allowing for an increase in frequency. The undervolt control loop dynamically reduces VDD below $VDD_{MAX}$, which also saves power and allows for an increase in the maximum frequency.

FIG. 6 sets forth a flow chart illustrating an example method of providing deterministic frequency and voltage enhancements for a processor in accordance with some embodiments of the present disclosure. The example method of FIG. 6 includes identifying 602 a plurality of parameters 605 related to a processor 603, the plurality of parameters 605 including at least a current supplied to the processor. In some examples, a microcontroller 601 of a processor 603 identifies parameters 605 related to the processor 603 including the current supplied to the processor 603 as well as other parameters 605 such as on-die temperatures, I/O configuration, processor core stop states including whether a particular core is clocked off or powered off, ambient conditions such as an off-die temperature and an altitude, an average voltage, and an average frequency. For example, the microcontroller 601 may identify a VDD current (IDD) for the processor 603 that is read by the microcontroller 601 from a voltage regulator module. As another example, the microcontroller 601 may identify on-die temperatures provided to the microcontroller 601 from the digital thermal sensors in the processor 603. As yet another example, the microcontroller 601 may identify average clock and power states for local regions (i.e., whether clocks or power are off in those regions) from locally embedded microcontrollers. As yet another example, the microcontroller 601 may identify an I/O bus configuration through polling of the I/O interfaces. As yet another example, the microcontroller 601 may identify an ambient temperature and/or an altitude from an ambient sensor. Further, the microcontroller 601 may record an average VDD voltage, sampled from the voltage regulator module, and the frequency, sampled from the system clock, over the preceding collection interval (e.g., 500 microseconds).

The method of FIG. 6 also includes determining 604, in dependence upon the plurality of parameters 605, one or more frequency scaling indexes 607 including determining an effective switching capacitance ratio. In some examples, the microcontroller 601 determines one or more frequency scaling indexes 607 using one or more of the parameters 605 including determining the effective switching capacitance ratio. For example, the current supplied to the processor 603, the average voltage supplied to the processor 603, and the average frequency of the processor 603, from among the plurality of parameters 605 can be used to determine the active effective switching capacitance, as described above with respect to equation 2. A thermal design point effective switching capacitance for a modeled workload can be determined using an AC current, DC current, and leakage value obtained from reference data, such as MVPD, for the same voltage and frequency and using the same equation. The effective switching capacitance ratio can be determined as the ratio of the active effective switching capacitance and the thermal design point effective switching capacitance (e.g., using equation 3 above). In some examples, the effective switching capacitance ratio is used as an index to a frequency scaling table. In other examples, the effective switching capacitance ratio may be used as an input to a frequency scaling equation that models frequency as a function of the effective switching capacitance ratio.

The method of FIG. 6 also includes identifying 606, in dependence upon the one or more frequency scaling indexes 607, a predetermined frequency parameter 609 for the processor 603. In some examples, the microcontroller 601 identifies the predetermined target frequency by using the effective switching capacitance ratio to index into a frequency scaling table. In one example, the frequency scaling table identifies an optimal frequency value that has been predetermined for a particular effective switching capacitance ratio. For example, the optimal frequency value may indicate the highest frequency (expressed absolutely or as a ratio of the current frequency) that does not violate power and thermal constraints of the processor for a workload whose metric is expressed by the effective switching capacitance ratio. In one example, a priori simulation of the processor is employed to identify the optimal frequency value for each effective switching capacitance ratio value. The result is a deterministic relationship between the activity of a workload relative to a thermal design point (indicated by the effective switching capacitance ratio) and an optimal clock frequency for that workload. For example, the frequency scaling table may indicate that a workload operating at 90% of the thermal design point (i.e., an effective switching capacitance ratio of 0.9) allows for a 3% boost in frequency. While the effective switching capacitance ratio is the primary index for the frequency scaling table, additional secondary indexes may also be used to identify the optimal frequency value for the workload, as will be described in more detail below. For example, an optimal frequency value may be provided for each combination of two or more indexes, as determined through processor simulation. Although frequency scaling tables are described, it will be appreciated that a frequency scaling equation (e.g., derived from simulations or models of the processor) may also be used to identify an optimal frequency value based on the effective switching capacitance ratio.

The method of FIG. 6 also includes transitioning 608, based on the frequency parameter 609, the processor 603 to a target clock frequency. In some examples, the microcontroller 601 transitions the processor to a target clock frequency by indicating a value of the target clock frequency to the system clock. For example, the microcontroller 601 may indicate the value by writing the value for the target clock frequency into a register used by the system clock. In some examples, the microcontroller 601 transitions the processor to the target clock frequency in frequency steps over a particular number of cycles or time increment.

For further explanation, FIG. 7 sets forth a flow chart illustrating another example method of providing deterministic frequency and voltage enhancements for a processor in accordance with some embodiments of the present disclosure. Like the example method of FIG. 6, the example method of FIG. 7 also includes identifying 602 a plurality of parameters 605 related to a processor 603, the plurality of parameters 605 including at least a current supplied to the processor; determining 604, in dependence upon the plurality of parameters 605, one or more frequency scaling indexes 607 including determining an effective switching capacitance ratio; identifying 606, in dependence upon the one or more frequency scaling indexes 607, a predetermined frequency parameter 609 for the processor 603; and transitioning 608, based on the frequency parameter 609, the processor 603 to a target clock frequency.

In the example method of FIG. 7, determining 604, in dependence upon the plurality of parameters 605, one or more frequency scaling indexes 607 further includes determining 702 a core activity state index. As discussed above, the core activity state index is based on core power and clock states collected from embedded power controllers, and can be utilized to further adjust the optimal frequency value that is determined based on the effective switching capacitance by, for example, correlating a core activity ratio to a predetermined power credit. In some examples, the microcontroller 601 determines 702 a core activity state index based on a ratio of the average time the cores are active, clocked off, or powered off, relative to fully active over a predetermined time interval. For example, the microcontroller 601 may compute the core activity state based on reported core STOP states. This core activity ratio is indicative of power consumption across the processor and whether cores may be disabled without affecting performance. For example, given a processor having ten core regions that are averaged to only 80% active, it may be the case that two core regions may be powered off without affecting performance. Thus, a power consumption model for fully active cores in the TDP definition can be reduced by 20%, which can allow for an additional frequency boost. In some examples, the core activity state index is a secondary index that is combined with the effective switching capacitance ratio (the primary index) to identify an optimal frequency value from a frequency scaling table. The frequency scaling table may be created by simulating all combinations of effective switching capacitance ratio and core activity state. These two indexes may also be combined with additional indexes and combinations of indexes to index into the frequency scaling table.

For further explanation, FIG. 8 sets forth a flow chart illustrating another example method of providing deterministic frequency and voltage enhancements for a processor in accordance with some embodiments of the present disclosure. Like the example method of FIG. 6, the example method of FIG. 8 also includes identifying 602 a plurality of parameters 605 related to a processor 603, the plurality of parameters 605 including at least a current supplied to the processor; determining 604, in dependence upon the plurality of parameters 605, one or more frequency scaling indexes 607 including determining an effective switching capacitance ratio; identifying 606, in dependence upon the one or more frequency scaling indexes 607, a predetermined frequency parameter 609 for the processor 603; and transitioning 608, based on the frequency parameter 609, the processor 603 to a target clock frequency.

In the example method of FIG. 8, determining 604, in dependence upon the plurality of parameters 605, one or more frequency scaling indexes 607 further includes determining 802 an input/output power index. As discussed above, the I/O power index is based on a runtime-sampled I/O configuration collected by polling I/O interfaces to determine link states, and can be utilized to further adjust the optimal frequency value that is determined based on the effective switching capacitance by, for example, correlating runtime I/O power to a predetermined power credit. In some examples, the microcontroller 601 determines 802 an I/O power index based on a runtime-sampled bus configuration, which can be identified by the microcontroller 601 polling the I/O interfaces. In some examples, the microcontroller 601 further determines 802 the I/O power index based on an I/O power proxy table 166 to identify the associated power parameter for each link type (e.g., memory, PCIe, SMP) of the current I/O configuration. The I/O power proxy table may be stored in the reference data or incorporated into the MVPD. These power parameters may be accumulated into a single index. When the current I/O configuration uses less power than the I/O configuration modeled for a TDP definition, the resulting power credit can allow for an additional frequency boost. In some examples, the I/O power index is a secondary index that is combined with the effective switching capacitance ratio (the primary index) to identify an optimal frequency value from a frequency scaling table. The frequency scaling table may be created by simulating all combinations of effective switching capacitance ratio and I/O power index. These two indexes may also be combined with additional indexes and combinations of indexes to index into the frequency scaling table.

For further explanation, FIG. 9 sets forth a flow chart illustrating another example method of providing deterministic frequency and voltage enhancements for a processor in accordance with some embodiments of the present disclosure. Like the example method of FIG. 6, the example method of FIG. 9 also includes identifying 602 a plurality of parameters 605 related to a processor 603, the plurality of parameters 605 including at least a current supplied to the processor; determining 604, in dependence upon the plurality of parameters 605, one or more frequency scaling indexes 607 including determining an effective switching capacitance ratio; identifying 606, in dependence upon the one or more frequency scaling indexes 607, a predetermined frequency parameter 609 for the processor 603; and transitioning 608, based on the frequency parameter 609, the processor 603 to a target clock frequency.

In the example method of FIG. 9, determining 604, in dependence upon the plurality of parameters 605, one or more frequency scaling indexes 607 further includes determining 902 an ambient conditions index. As discussed above, the ambient conditions index is based on data collected from sensors measuring conditions outside of the processor or processor module, and can be utilized to further adjust the optimal frequency value that is determined based on the effective switching capacitance by, for example, correlating one or more ambient conditions parameters to a predetermined power credit. In some examples, the microcontroller 601 determines 902 an ambient conditions index based on one or more ambient conditions parameters such as ambient temperature and/or altitude. The ambient condition index adjusts for the ambient room temperature and altitude to give a thermal cooling credit to the expected TDP definition. For example, for each degree Celsius that the ambient room temperature is below a reference value used for the TDP definition, N watts of power credit may be awarded. This temperature component is dependent on sensing at the system air-intake, not within the processor, which provides deterministic benefit (i.e., not sensitive to manufacturing variations). For example, an ambient temperature sensor may be an off-die sensor, such as a sensor that is coupled to the processor module or another component in the processor chassis, or the ambient temperature may be relayed by the operating system. The altitude component stems from higher density air improving the effectiveness of heatsink cooling at altitudes less than 1000 meters. In some examples, the ambient conditions index is a secondary index that is combined with the effective switching capacitance ratio (the primary index) to identify an optimal frequency value from a frequency scaling table. The frequency scaling table may be created by simulating all combinations of effective switching capacitance ratio and ambient conditions. These two indexes may also be combined with additional indexes and combinations of indexes to index into the frequency scaling table.

For further explanation, FIG. 10 sets forth a flow chart illustrating another example method of providing deterministic frequency and voltage enhancements for a processor in accordance with some embodiments of the present disclosure. Like the example method of FIG. 6, the example method of FIG. 10 also includes identifying 602 a plurality of parameters 605 related to a processor 603, the plurality of parameters 605 including at least a current supplied to the processor; determining 604, in dependence upon the plurality of parameters 605, one or more frequency scaling indexes 607 including determining an effective switching capacitance ratio; identifying 606, in dependence upon the one or more frequency scaling indexes 607, a predetermined frequency parameter 609 for the processor 603; and transitioning 608, based on the frequency parameter 609, the processor 603 to a target clock frequency.

In the example method of FIG. 10, transitioning 608, based on the frequency parameter 609, the processor 603 to a target clock frequency further includes setting 1002, based on the target clock frequency, a target power supply voltage for the processor. Once a new target frequency is determined, the microcontroller 601 also adjusts the VDD of the processor 603 based on the new clock frequency. In some examples, the microcontroller 601 determines a new VDD for the processor based on reference data (e.g., MVPD) generated during processor characterization. For example, the reference data may map frequency values to a VDD for the processor. In some examples, the microcontroller 601 sets the power supply voltage for the processor 603 by indicating the new power supply voltage to a voltage regulator module. For example, the microcontroller 601 may write a new VDD value to a register used by the voltage regulator module to control VDD for the processor 603.

Figure 11:
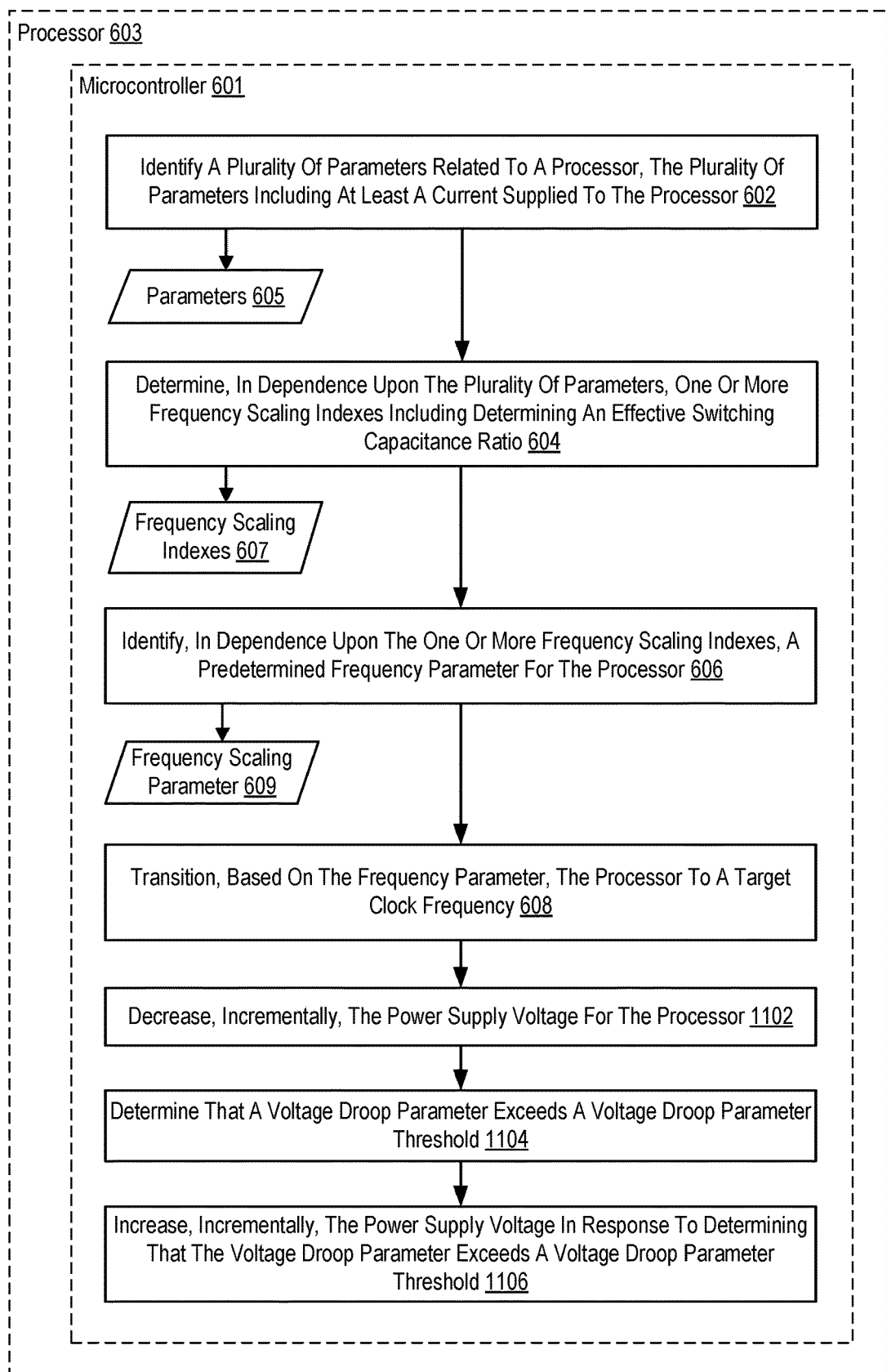
FIG. 11 sets forth a flow chart illustrating another example method of providing deterministic frequency and voltage enhancements for a processor in accordance with some embodiments of the present disclosure.

For further explanation, FIG. 11 sets forth a flow chart illustrating another example method of providing deterministic frequency and voltage enhancements for a processor in accordance with some embodiments of the present disclosure. Like the example method of FIG. 6, the example method of FIG. 11 also includes identifying 602 a plurality of parameters 605 related to a processor 603, the plurality of parameters 605 including at least a current supplied to the processor; determining 604, in dependence upon the plurality of parameters 605, one or more frequency scaling indexes 607 including determining an effective switching capacitance ratio; identifying 606, in dependence upon the one or more frequency scaling indexes 607, a predetermined frequency parameter 609 for the processor 603; and transitioning 608, based on the frequency parameter 609, the processor 603 to a target clock frequency.

As discussed above, an undervolt control loop decreases processor voltage to the lowest value that does not impact processor performance. Accordingly, the example method of FIG. 11 further includes decreasing 1102, incrementally, the power supply voltage for the processor 603. In some examples, the microcontroller 601 decreases 1102, incrementally, the power supply voltage for the processor 603 by decreasing the VDD for the processor by V volts every T microseconds (e.g., 125 microseconds). For example, VDD may decrease during a processor idle state that is determined by monitoring the outputs of digital droop sensors. In some examples, the microcontroller 601 decreases the power supply voltage by indicating a new power supply voltage to a voltage regulator module. For example, the microcontroller 601 may write a new VDD value to a register used by the voltage regulator module to control VDD for the processor 603.

As discussed above, digital droop sensors (e.g., digital droop sensors 532 in FIG. 5) output a value that indicates a voltage droop (i.e., a difference between a supplied voltage VDD and the voltage in the core). Accordingly, the example method of FIG. 11 also includes determining 1104 that a voltage droop parameter exceeds a voltage droop parameter threshold. For example, a droop counter may be updated each time a particular droop sensor outputs, per cycle, a value that is below a particular level. In some examples, the microcontroller 601 determines 1104 that the voltage droop parameter exceeds a voltage droop parameter threshold by monitoring the droop rate (i.e., the number of cycles per window of cycles that an undervoltage voltage droop is detected) that is based on the outputs of digital droop sensors and comparing the droop rate to a programmable threshold. In some examples, the format output by the digital droops sensors is thermometer code, and a voltage droop counter is updated each time the thermometer code value is below a particular undervolting level. This undervolting level may be higher than a throttling level that triggers voltage droop mitigation. In some examples, the droop rate threshold for undervolting may be updated by the microcontroller 601 in response to a target frequency transition initiated as part of the WOF control loop discussed above.

In some cases, a droop counter may be incremented for every cycle that the droop-mitigation action is actuated.

The example method of FIG. 11 also includes increasing 1106, incrementally, the power supply voltage in response to determining that the voltage droop parameter exceeds a voltage droop parameter threshold. In some examples, the microcontroller 601 increases 1106 the power supply voltage incrementally by increasing VDD incrementally in response to determining that the droop rate (e.g., the number of cycles per window of cycles that an undervolting droop is identified) is higher than a predetermined droop rate threshold. In some examples, the microcontroller 601 increases the power supply voltage by indicating a new power supply voltage to a voltage regulator module. For example, the microcontroller 601 may write a new VDD value to a register used by the voltage regulator module to control VDD for the processor 603.

In some embodiments, the voltage droop parameter is based on droop mitigation actions, i.e., an event where a detected voltage droop triggers a droop mitigation action such as core throttling as discussed below. Thus, the voltage droop parameter may be a number of droop mitigation actions or a rate of droop mitigation actions, and the voltage droop parameter threshold may be a threshold number or rate of droop mitigation actions. In some examples, when droop mitigation is enabled, the voltage is increased when the number or rate of droop mitigation actions exceeds the threshold number or rate. Alternatively, the voltage can be increased when the number or fraction of cycles that the droop mitigation action is active exceeds a threshold. The voltage is decreased when the number or rate of mitigation actions is below a threshold number or rate. Alternatively, the voltage can be decreased when the number or fraction of cycles that the droop mitigation action is active exceeds a threshold.

In some variations, a size of a power supply voltage increment may be dynamically selected based on the voltage droop parameter. Likewise, a size of a power supply voltage decrement may be dynamically selected based on the voltage droop parameter. For example, the size of the voltage increment or decrement may be chosen based on the number or rate of droop mitigation actions/events or the number or rate of cycles with droop-mitigation active.

Figure 12:
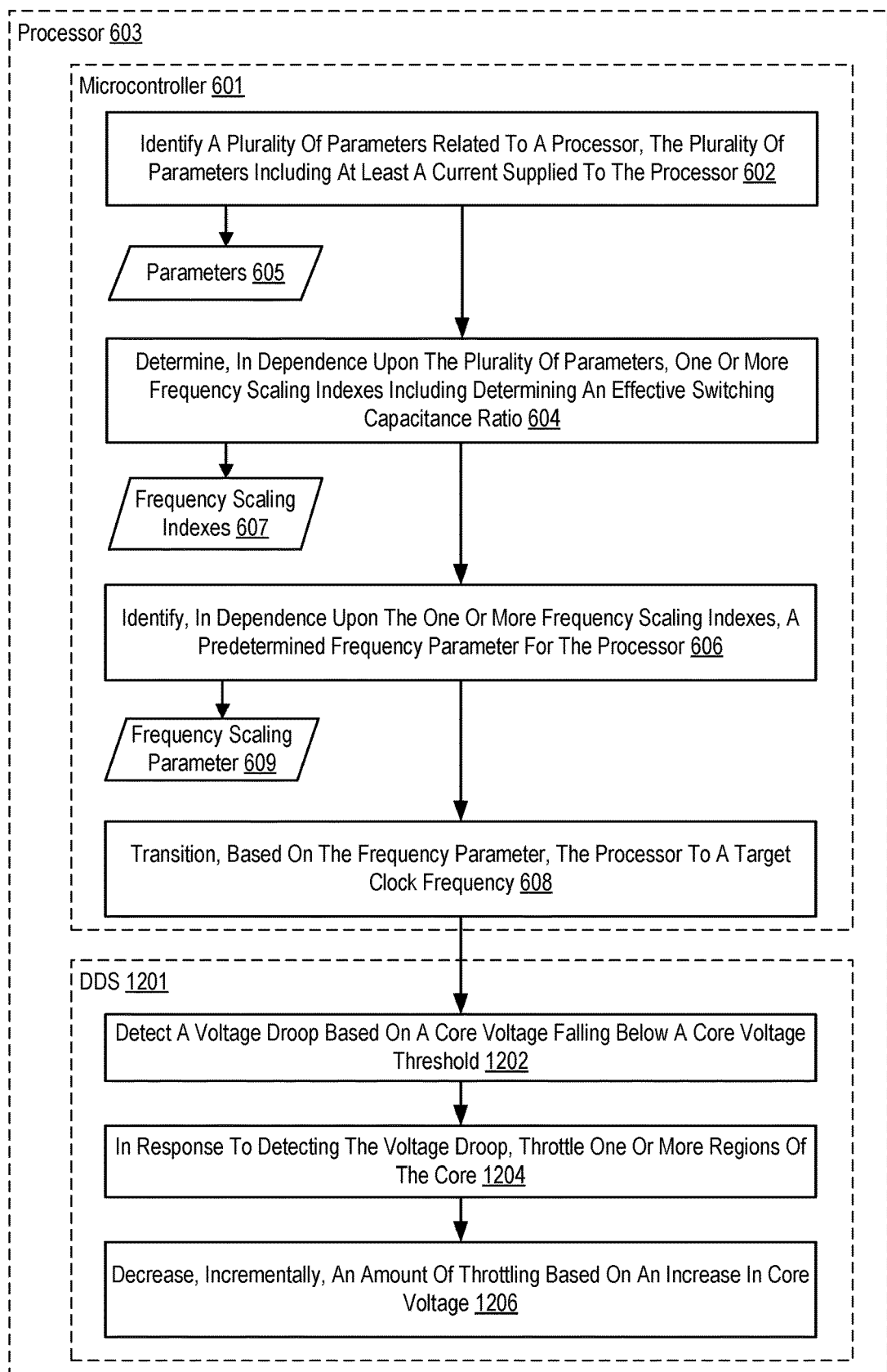
FIG. 12 sets forth a flow chart illustrating another example method of providing deterministic frequency and voltage enhancements for a processor in accordance with some embodiments of the present disclosure.

For further explanation, FIG. 12 sets forth a flow chart illustrating another example method of providing deterministic frequency and voltage enhancements for a processor in accordance with some embodiments of the present disclosure. Like the example method of FIG. 6, the example method of FIG. 12 also includes identifying 602 a plurality of parameters 605 related to a processor 603, the plurality of parameters 605 including at least a current supplied to the processor; determining 604, in dependence upon the plurality of parameters 605, one or more frequency scaling indexes 607 including determining an effective switching capacitance ratio; identifying 606, in dependence upon the one or more frequency scaling indexes 607, a predetermined frequency parameter 609 for the processor 603; and transitioning 608, based on the frequency parameter 609, the processor 603 to a target clock frequency.

As discussed above, a digital droop sensor mitigates core voltage droops by throttling instruction processing rates in core regions where the droop is detected. A voltage droop may occur when a new load is created during a transition of an idle state to a high intensity workload. Accordingly, the example method of FIG. 12 further includes detecting 1202 a voltage droop based on a core voltage falling below a core voltage threshold. In some examples, a digital droop sensor 1201 of the processor 603 detects 1202 a voltage droop based on a core voltage falling below a core voltage threshold by detecting a core voltage in a region where the digital droop sensor 1201 is located and comparing the detected core voltage to a programmable core voltage threshold. In some implementations, detecting 1202 a voltage droop based on a core voltage falling below a core voltage threshold is carried out by a digital droop sensor 1201 of the processor 603 registering a thermometer code bin based on a detected core voltage. If the thermometer code bin falls below a programmable thermometer code bin threshold, a voltage droop is detected.

The example method of FIG. 12 also includes, in response to detecting the voltage droop, throttling 1204 one or more regions of the core. In some examples, the digital droop sensor 1201 throttles 1204 one or more regions of the core by reducing an instruction processing rate in those regions. For example, the instruction processing rate may be reduced by reducing the local clock that is supplied to those regions or reducing latch rates. In some examples, the digital droop sensor utilizes a throttle sequencing engine to dispatch throttle commands to local core throttle controls that reduce throughput.

The example method of FIG. 12 also includes decreasing 1206, incrementally, an amount of throttling based on an increase in core voltage. As discussed above, discontinuing core throttling when core voltage rises above the core voltage threshold could trigger another voltage droop. Accordingly, the digital droop sensor 1201 decreases 1206 an amount of throttling based on an increase in core voltage by gradually decreasing the amount of throttling that is applied to the core regions while the core voltage adjusts to the new load created by a transition of an idle state to a high intensity workload. For example, the digital droop sensor may decrease throttling by an incremental amount such that the core voltage is allowed to adjust to the increase in load caused by the decrease in throttling before throttling is further decreased. In some examples, the core voltage threshold is adjusted dynamically in response to the WOF controller 152 transitioning the processor to a target clock frequency.

Figure 13:
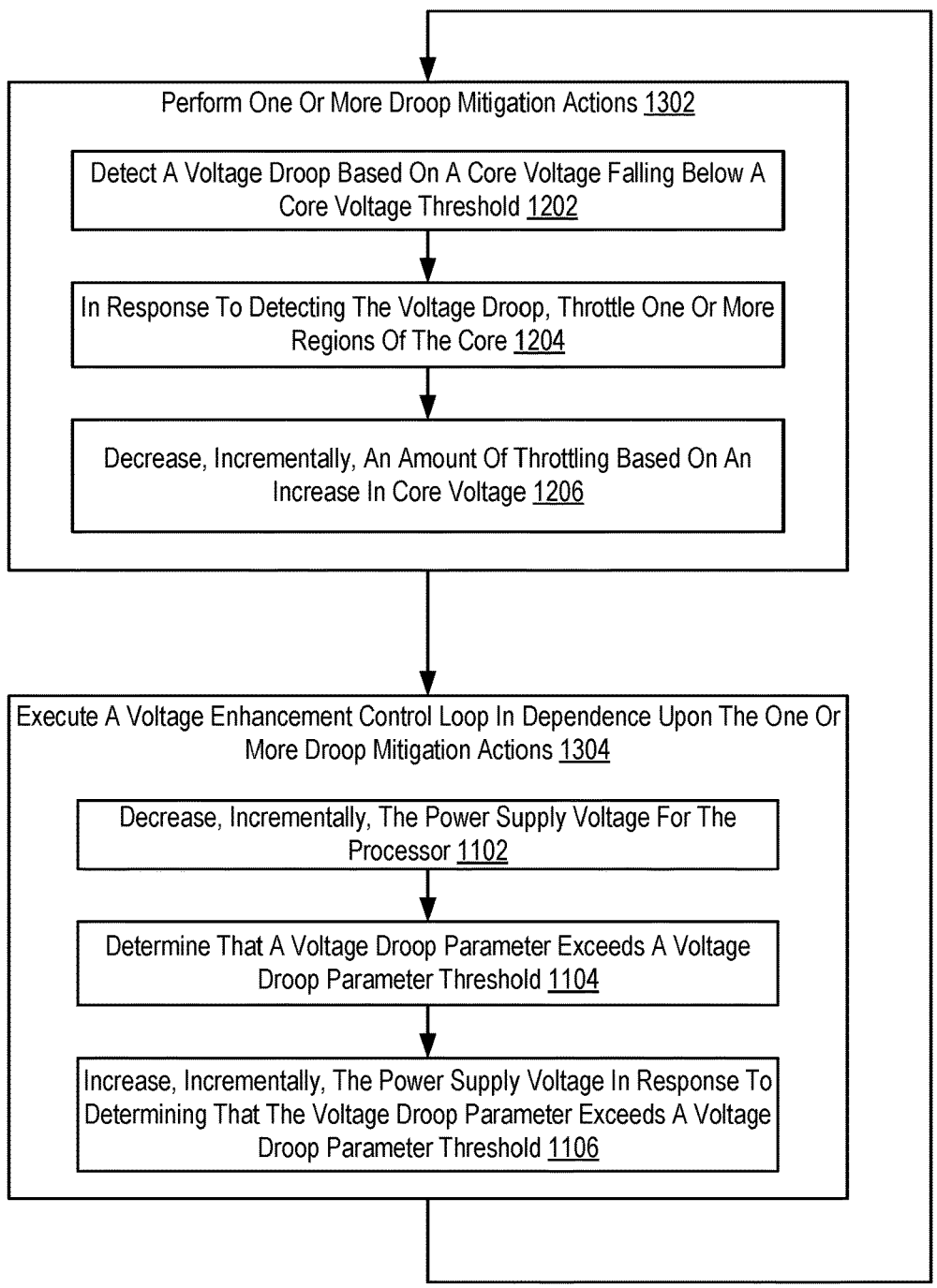
FIG. 13 sets forth a flow chart illustrating another example method of providing deterministic frequency and voltage enhancements for a processor in accordance with some embodiments of the present disclosure.

For further explanation, FIG. 13 sets forth a flow chart illustrating another example method of providing deterministic frequency and voltage enhancements for a processor in accordance with some embodiments of the present disclosure. The example method of FIG. 13 includes performing 1302 one or more droop mitigation actions. In some examples, performing 1302 one or more droop mitigation actions may be carried out by detecting 1202 a voltage droop based on a core voltage falling below a core voltage threshold, throttling 1204 one or more regions of the core in response to detecting the voltage droop, and decreasing 1206, incrementally, an amount of throttling based on an increase in core voltage, as discussed above.

The example method of FIG. 13 also includes executing 1304 a voltage enhancement control loop in dependence upon the one or more droop mitigation actions. In some examples, executing 1304 the voltage enhancement control loop in dependence upon the one or more droop mitigation actions may be carried out by decreasing 1102, incrementally, the power supply voltage for the processor 603, determining 1104 that a voltage droop parameter exceeds a voltage droop parameter threshold, and increasing 1106, incrementally, the power supply voltage in response to determining that the voltage droop parameter exceeds a voltage droop parameter threshold, as discussed above. In some examples, the voltage droop parameter is based on the number or rate of droop mitigation actions, or the number of cycles or percentage of cycles that a droop mitigation action is active.

As discussed above, some embodiments use a sensor to detect voltage droops based on a core voltage falling below a core voltage threshold. When droops are detected, the effect of the droop is then mitigated by either throttling one or more regions of the core in response to detecting the voltage droop, or reducing the core clock frequency, to prevent functional errors. When robust droop mitigation is employed, the voltage can be reduced far below the safe minimum voltage without droop mitigation. When a droop is detected, the droop mitigation action (either throttling or frequency reduction) may result in a small reduction in performance for the clock cycles when the mitigation action is occurring. As the voltage is reduced, the fraction of clock cycles with reduce performance increases, eventually resulting in measurable performance loss at low voltage.

In some variations, the sensor that is used for voltage control is offset or calibrated differently than the voltage sensor used for droop mitigation. For example, the sensor for voltage control is set to a higher voltage than the sensor used to trigger the droop mitigation action. In this case, the voltage can be controlled to higher values, to reduce the performance-loss from excessive droop-mitigation actions to a lower level than is possible when exactly the same sensor-threshold is used for both droop mitigation and voltage control.

In view of the foregoing, it will be appreciated that providing deterministic frequency and voltage enhancements for a processor in accordance with present disclosure provides many advantages, including but not limited to: a)

a workload optimized frequency controller that dynamically monitors the processor and system conditions and deterministically sets the processor frequency for maximum performance; b) robust droop mitigation using digital droop sensors combined with core throttling that reduces the voltage guardband and increases maximum frequency; and c) an undervolt voltage control loop that dynamically reduces VDD below $VDD_{MAX}$ based on feedback from digital droops sensors, providing a boost to maximum frequency.

The present disclosure may be a system, a method, or a computer program product. The computer program product may include a computer readable storage medium (or media) having computer readable program instructions thereon for causing a processor to carry out aspects of the present disclosure.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and a wireless network. The network may comprise copper transmission cables, optical transmission fibers, wireless transmission, routers, firewalls, switches, gateway computers and edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and block diagrams of methods, apparatus (systems), and computer program products according to embodiments of the disclosure. It will be understood that each block of the flowchart illustrations and block diagrams, and combinations of blocks in the flowchart illustrations and block diagrams, can be implemented by computer readable program instructions.

These computer readable program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowcharts and block diagram block or blocks. These computer readable program instructions may also be stored in a computer readable storage medium that can direct a computer, a programmable data processing apparatus, and other devices to function in a particular manner, such that the computer readable storage medium having instructions stored therein comprises an article of manufacture including instructions which implement aspects of the function/act specified in the flowcharts and block diagram block or blocks.

The computer readable program instructions may also be loaded onto a computer, other programmable data processing apparatus, or other device to cause a series of operational steps to be performed on the computer, other programmable apparatus, or other device to produce a computer implemented process, such that the instructions which execute on the computer, other programmable apparatus, or other device implement the functions/acts specified in the flowcharts and block diagram block or blocks.

The flowcharts and block diagrams in the Figures illustrate the architecture, functionality, and operation of possible implementations of systems, methods, and computer program products according to various embodiments of the present disclosure. In this regard, each block in the flowcharts or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and flowchart illustrations, and combinations of blocks in the block diagrams and flowchart illustrations, can be implemented by special purpose hardware-based systems that perform the specified functions or acts or carry out combinations of special purpose hardware and computer instructions.

It will be understood from the foregoing description that modifications and changes may be made in various embodiments of the present invention without departing from its true spirit. The descriptions in this specification are for purposes of illustration only and are not to be construed in a limiting sense. The scope of the present invention is limited only by the language of the following claims.

What is claimed is:

1. A method of providing deterministic frequency and voltage enhancements on a processor, the method comprising:
   identifying a plurality of parameters related to a processor, the plurality of parameters including at least a current supplied to the processor;
   determining, in dependence upon the plurality of parameters, one or more frequency scaling indexes including determining an effective switching capacitance ratio;
   identifying, in dependence upon the one or more frequency scaling indexes, a predetermined frequency parameter for the processor; and
   transitioning, based on the frequency parameter, the processor to a target clock frequency.

2. The method of claim 1, wherein the plurality of parameters further includes one or more of: an ambient temperature, an altitude, one or more input/output (I/O) configuration parameters, one or more core power states, one or more core clock states, an average voltage, and an average frequency.

3. The method of claim 1, wherein the predetermined frequency parameter is identified from a table that maps the one or more frequency scaling indexes to the predetermined frequency parameter.

4. The method of claim 1, wherein determining, based on the plurality of parameters, one or more frequency scaling indexes includes determining a core activity state index.

5. The method of claim 1, wherein determining, based on the plurality of parameters, one or more frequency scaling indexes includes determining an input/output power index.

6. The method of claim 1, wherein determining, based on the plurality of parameters, one or more frequency scaling indexes includes determining an ambient conditions index.

7. The method of claim 1, wherein transitioning, based on the target clock frequency, the processor to a target clock frequency includes setting, based on the target clock frequency, a target power supply voltage for the processor.

8. The method of claim 7 further comprising:
   decreasing, incrementally, the power supply voltage for the processor;
   determining that a voltage droop parameter exceeds a voltage droop parameter threshold; and
   increasing, incrementally, the power supply voltage in response to determining that the voltage droop parameter exceeds a voltage droop parameter threshold.

9. The method of claim 1 further comprising:
   detecting a voltage droop based on a core voltage falling below a core voltage threshold;
   in response to detecting the voltage droop, throttling one or more regions of the core; and
   decreasing, incrementally, an amount of throttling based on an increase in core voltage.

10. The method of claim 9, wherein the core voltage threshold is adjusted dynamically in response to transitioning, based on the frequency parameter, the processor to a target clock frequency.

11. An apparatus comprising:
   a processor; and
   a memory storing instructions that, when executed by the processor, configure the apparatus to:
   identify a plurality of parameters related to a processor, the plurality of parameters including at least a current supplied to the processor;
   determine, in dependence upon the plurality of parameters, one or more frequency scaling indexes including determining an effective switching capacitance ratio;
   identify, in dependence upon the one or more frequency scaling indexes, a predetermined frequency parameter for the processor; and
   transition, based on the frequency parameter, the processor to a target clock frequency.

12. The apparatus of claim 11 wherein the predetermined frequency parameter is identified from a table that maps the one or more frequency scaling indexes to the predetermined frequency parameter.

13. The apparatus of claim 11, wherein determining, based on the plurality of parameters, one or more frequency scaling indexes includes determining a core activity state index.

14. The apparatus of claim 11, wherein determining, based on the plurality of parameters, one or more frequency scaling indexes includes determining an input/output power index.

15. The apparatus of claim 11, wherein determining, based on the plurality of parameters, one or more frequency scaling indexes includes determining an ambient conditions index.

16. A method of providing deterministic frequency and voltage enhancements on a processor, the method comprising:
   decreasing, incrementally, a power supply voltage for a processor;
   determining that a voltage droop parameter exceeds a voltage droop parameter threshold;
   increasing, incrementally, the power supply voltage in response to determining that the voltage droop parameter exceeds a voltage droop parameter threshold
   detecting a voltage droop within a processor core based on a core voltage within the processor core falling below a core voltage threshold; and
   in response to detecting the voltage droop, throttling one or more regions of the processor core.

17. The method of claim 16 further comprising decreasing, incrementally, an amount of throttling based on an increase in core voltage.

18. The method of claim 17, wherein the core voltage threshold is adjusted dynamically in response to transitioning, based on a frequency parameter, the processor to a target clock frequency.

19. The method of claim 16, wherein the voltage droop parameter is at least one of a number of voltage droop events, a rate of voltage droop events, a number of cycles that a droop mitigation action is active, and a fraction of cycles that the droop mitigation action is active.

20. The method of claim 16, wherein a size of a power supply voltage increment is dynamically selected based on the voltage droop parameter; and wherein a size of a power supply voltage decrement is dynamically selected based on the voltage droop parameter.

* * * * *